US008213683B2

(12) United States Patent
Chen et al.

(10) Patent No.: US 8,213,683 B2
(45) Date of Patent: Jul. 3, 2012

(54) DRIVING SUPPORT SYSTEM WITH PLURAL DIMENSION PROCESSING UNITS

(75) Inventors: Liang-Gee Chen, Taipei (TW); Yu-Lin Chang, Taipei (TW); Yi-Min Tsai, Taipei (TW); Chao-Chung Cheng, Taipei (TW)

(73) Assignee: National Taiwan University, Taipei (TW)

( * ) Notice: Subject to any disclaimer, the term of this patent is extended or adjusted under 35 U.S.C. 154(b) by 981 days.

(21) Appl. No.: 12/230,201

(22) Filed: Aug. 26, 2008

(65) Prior Publication Data

US 2010/0054541 A1 Mar. 4, 2010

(51) Int. Cl.
*G06K 9/00* (2006.01)

(52) U.S. Cl. ........................................................ 382/104

(58) Field of Classification Search .................. 382/104, 382/106, 107, 154; 340/903, 933, 937, 939, 340/988, 435, 436, 3.41; 180/271; 701/300, 701/301

See application file for complete search history.

(56) References Cited

U.S. PATENT DOCUMENTS

| | | | | |
|---|---|---|---|---|
| 5,109,425 | A * | 4/1992 | Lawton | 382/107 |
| 7,295,697 | B1 * | 11/2007 | Satoh | 382/154 |
| 2002/0113756 | A1 * | 8/2002 | Tuceryan et al. | 345/8 |
| 2003/0021490 | A1 * | 1/2003 | Okamoto et al. | 382/284 |
| 2003/0233589 | A1 * | 12/2003 | Alvarez | 713/300 |
| 2005/0031169 | A1 * | 2/2005 | Shulman et al. | 382/104 |
| 2005/0174429 | A1 * | 8/2005 | Yanai | 348/148 |
| 2006/0015254 | A1 * | 1/2006 | Smith | 702/3 |
| 2006/0200285 | A1 * | 9/2006 | Obradovich | 701/30 |
| 2006/0210117 | A1 * | 9/2006 | Chang et al. | 382/113 |
| 2007/0003108 | A1 * | 1/2007 | Chinomi et al. | 382/104 |
| 2007/0008091 | A1 * | 1/2007 | Takenaga et al. | 340/435 |
| 2008/0159620 | A1 * | 7/2008 | Camus et al. | 382/154 |

* cited by examiner

*Primary Examiner* — Jason M Repko
*Assistant Examiner* — Shervin Nakhjavan
(74) *Attorney, Agent, or Firm* — Bacon & Thomas, PLLC

(57) ABSTRACT

A driving support system with plural dimension processing units (DPUs) for indicating a condition of a surrounding area is disclosed. The driving support system of a vehicle includes plural image capturing devices disposed around the vehicle; at least a dimension processing unit (DPU) connected with the plural image capturing devices for receiving images from the plural image capturing devices and then producing plural related depth maps; a controller connected with the DPU for receiving the plural related depth maps and then producing an indicating data; and a display device connected with the controller for displaying the indicating data around the vehicle in a vertical view.

15 Claims, 5 Drawing Sheets

DRIVING SUPPORT SYSTEM WITH PLURAL DIMENSION PROCESSING UNITS

FIELD OF THE INVENTION

This invention relates to an apparatus for driving support system, and more particularly, to a driving support system with plural dimension processing units (DPUs) for indicating a condition of a surrounding area.

BACKGROUND OF THE INVENTION

There are various automatic tracking control systems, which detect the speed of a preceding vehicle and determine the distance between the subject and the preceding vehicle, that is the inter-vehicle distance, based on the detected speed, and which maintain the distance between the two vehicles in order to support long-distance driving with safety.

An apparatus for indicating a condition of a surrounding area of a vehicle has been known which photographs the surrounding area using a vehicle-mounted camera, and displays an image photographed on a display device. FIG. 1 is a flowchart for showing the specific operation of the moving body/approaching object detecting means according to the prior art. First, in the same manner as in the vibration component extraction, a motion vector ($V_x$, $V_y$) with respect to each point (x, y) on the screen and the virtual vanishing point ($x_0$, $y_0$) are input (S21 and S22).

It is determined whether or not the point is a moving body depending upon whether or not the input vector represents movement toward the vanishing point after canceling the offset (S23). Meanwhile, motion vectors each determined as a moving body are detected in respective portions of the moving body on the screen. Therefore, an area including these motion vectors is grouped, so as to generate a rectangular moving body area (S24). A distance from the vehicle to this moving body is then estimated on the position of the lower end of the moving body area (S25).

The distance to the moving body area estimated at this point is stored in a memory. When a moving body area is detected in the same position through processing of a subsequent frame image and the estimated distance to the moving body area is shorter than the estimated distance obtained in the previous frame and stored in the memory, the object included in the moving body area is determined as an approaching object (S26). On the other hand, a distance Z is calculated on the basis of the size of the vector (with the offset canceled) by the following formula (S27): $Z=dZ*r/dr$ wherein dZ is a travel length of the vehicle between the frames, r is a distance from the vanishing point on the screen and dr is the size of the motion vector, which are represented as follows: $r=sqrt((x-x0)^2+(y-y0)^2))$ $dr=sqrt(Vx^2+(Vy-Vdy)^2)$, wherein the distance Z obtained at this point is compared with the distance to the road surface stored as the default distance value (S28). Thus, an object positioned higher than the road surface is determined as an obstacle. Also, when an object is approaching from substantially right behind like a vehicle, a motion vector is obtained in the vicinity of the vanishing point, but its size is very small. Therefore, when the distance Z is obtained in the aforementioned manner, a value representing that the object is positioned below the road surface may be obtained. Since no object is generally present below the road surface, such a motion vector is determined as a moving body, so as to be processed through the moving body area extracting processing S24.

Through the aforementioned processing, an obstacle, a moving body, an approaching object and their distances in the image are obtained on the basis of the respective motion vectors of the points on the screen (S29), and the resultant information is output to the image synthesizing means. The image synthesizing means synthesizes a frame of the rectangular area to be lighted in red on the camera image input from the imaging means and outputs the synthesized image to the display device. The display device displays an image obtained by laterally inverting the synthesized image so as to be in the same phase as an image on a rearview mirror.

However, the prior art provides a driving support system, which includes an apparatus for indicating a condition of a surrounding area of a vehicle from a vehicle-mounted camera merely. As we know, it is impossible to acquire entire information of surrounding via a camera merely. There should be a dead space unable to be informed, if a camera is introduced for capturing image. Furthermore, it is difficult to detect the size of the object near the vehicle according to the prior art. Several points instead of real shape in proportional representation would be introduced to indicate a real-time related map around the vehicle, if the size of the object near the vehicle can't be informed. Obviously, the prior art can't provide integrated and broad functions.

Therefore, it needs to provide an apparatus for providing vehicle integrated and broad alarm information to a vehicle operator by means of introducing plural dimension processing units (DPUs) for rectifying those drawbacks and limitations in operation of the prior art and solving the above problems.

SUMMARY OF THE INVENTION

This paragraph extracts and compiles some features of the present invention; other features will be disclosed in the follow-up paragraph. It is intended to cover various modifications and similar arrangements included within the spirit and scope of the appended claims, and this paragraph also is considered to refer.

It is an object of the present invention to provide a driving support system to a vehicle operator, which introduces plural dimension processing units (DPUs) for processing plural images, simplifies the entire system and the control process thereof, is capable of achieving the purpose of indicating a condition of a surrounding area of the vehicle in a vertical view, and can rectify those drawbacks of the prior art and solve the above problems.

In accordance with an aspect of the present invention, the driving support system of a vehicle includes plural image capturing devices disposed around the vehicle; plural dimension processing units (DPUs) connected with the plural image capturing devices for receiving images from the plural image capturing devices and then producing plural related depth maps; and a controller connected with the plural DPUs for receiving the plural related depth maps and indicating a condition of a surrounding area of the vehicle.

Certainly, the plural image capturing devices can be cameras.

Preferably, each of the plural DPUs further includes an intrinsic camera parameter calibration module for receiving images from the plural image capturing devices; a disparity estimation module connected with the intrinsic camera parameter calibration module; an extrinsic camera parameter estimation module connected with the disparity estimation module; a depth estimation module connected with the extrinsic camera parameter estimation module; and a depth fusion module connected with the depth estimation module for outputting the plural related depth maps.

Preferably, more than one of the plural image capturing devices is connected to one of the plural DPUs.

Preferably, the driving support system further includes a display device connected with the controller for indicating the condition of the surrounding area of the vehicle in a vertical view.

Preferably, the driving support system further includes a GPS/GPRS module communicating with the controller for providing a display data.

Certainly, the display data be one selected from a group of a unit's ID, a time, a GPS's latitude and longitude, a speed, a direction, a temperature, a device's status, an event number, a report configuration parameter, and a mixture thereof.

In accordance with another aspect of the present invention, the driving support system of a vehicle includes plural image capturing devices disposed around the vehicle; at least a dimension processing unit (DPU) connected with the plural image capturing devices for receiving images from the plural image capturing devices and then producing plural related depth maps; a controller connected with the DPU for receiving the plural related depth maps and then producing an indicating data; and a display device connected with the controller for displaying the indicating data around the vehicle in a vertical view.

Preferably, the plural image capturing devices are cameras.

Preferably, the DPU further includes an intrinsic camera parameter calibration module for receiving images from the plural image capturing devices; a disparity estimation module connected with the intrinsic camera parameter calibration module; an extrinsic camera parameter estimation module connected with the disparity estimation module; a depth estimation module connected with the extrinsic camera parameter estimation module; and a depth fusion module connected with the depth estimation module for outputting the plural related depth maps.

Preferably, more than one of the plural image capturing devices is connected to the DPU.

Preferably, the driving support system further includes a GPS/GPRS module communicating with the controller for providing a display data.

Preferably, the display data comprises a unit's ID, a time, a GPS's latitude and longitude, a speed, a direction, a temperature, a device's status, an event number, a report configuration parameter, and a mixture thereof.

According the present invention, the driving support system of a vehicle could include an image capturing module having plural image capturing devices disposed around the vehicle for taking plural images; an estimation module connected with the image capturing module via multiple channels for receiving the plural images and then producing plural related depth maps; a controller connected with the estimation module for receiving the plural related depth maps and then producing an indicating data; and a display device connected with the controller for displaying the indicating data around the vehicle in a vertical view.

Certainly, the plural image capturing devices can be cameras.

Preferably, the estimation module further includes plural dimension processing units (DPUs), wherein each of the plural DPUs further includes an intrinsic camera parameter calibration module for receiving images from the plural image capturing devices; a disparity estimation module connected with the intrinsic camera parameter calibration module; an extrinsic camera parameter estimation module connected with the disparity estimation module; a depth estimation module connected with the extrinsic camera parameter estimation module; and a depth fusion module connected with the depth estimation module for outputting the plural related depth maps.

Preferably, the driving support system further includes a GPS/GPRS module communicating with the controller for providing a display data.

Preferably, the display data comprises a unit's ID, a time, a GPS's latitude and longitude, a speed, a direction, a temperature, a device's status, an event number, a report configuration parameter, and a mixture thereof.

The present invention needs not be limited to the above embodiment. The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention discloses a driving support system to a vehicle operator by means of introducing plural dimension processing units (DPUs) for processing plural images, and the objects and advantages of the present invention will become more readily apparent to those ordinarily skilled in the art after reviewing the following detailed description. The present invention needs not be limited to the following embodiment.

Figure 1:
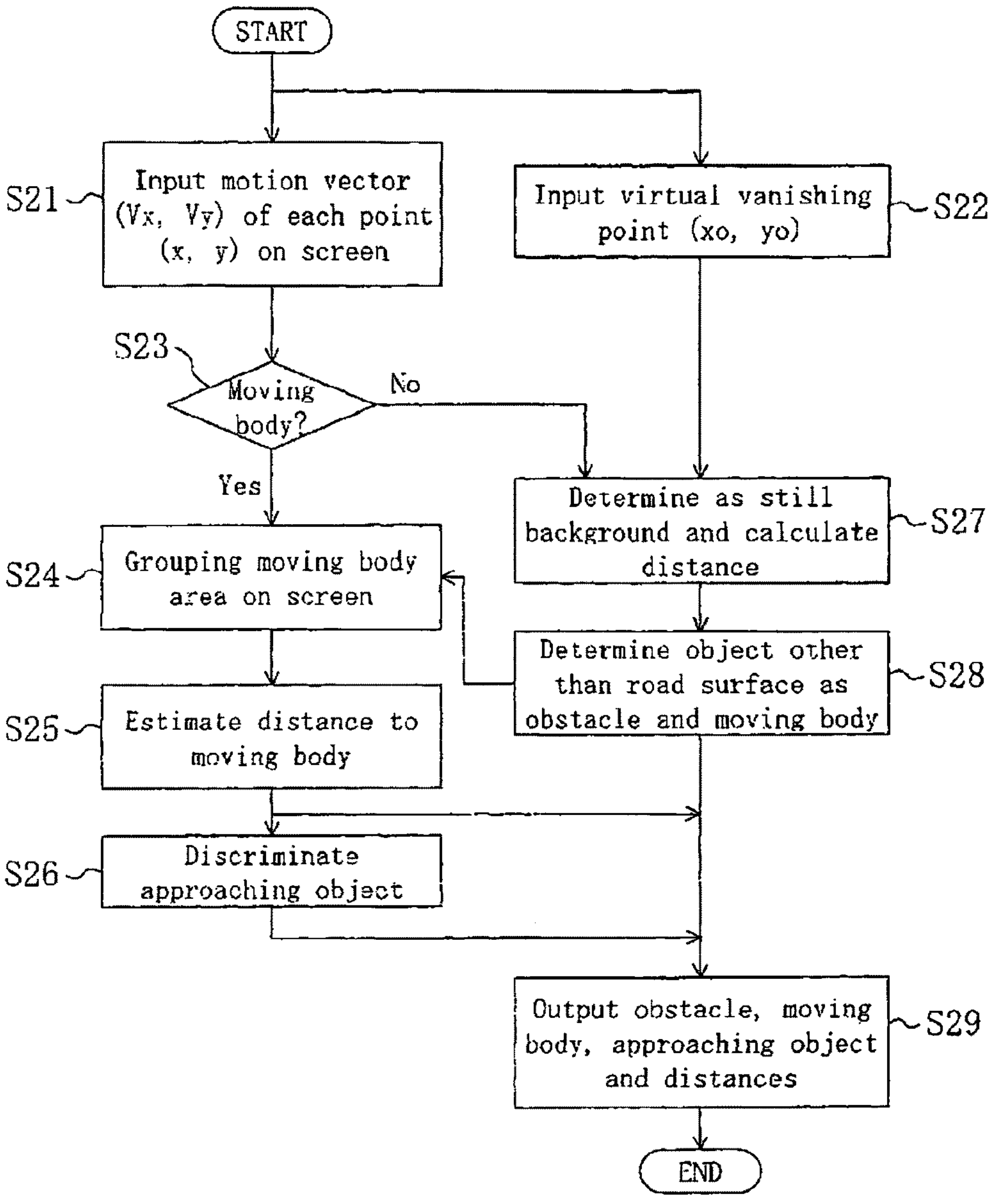
FIG 1 Prior Art
FIG. 1 illustrates a flowchart for showing the specific operation of the moving body/approaching object detecting means according to the prior art.
Figure 2:
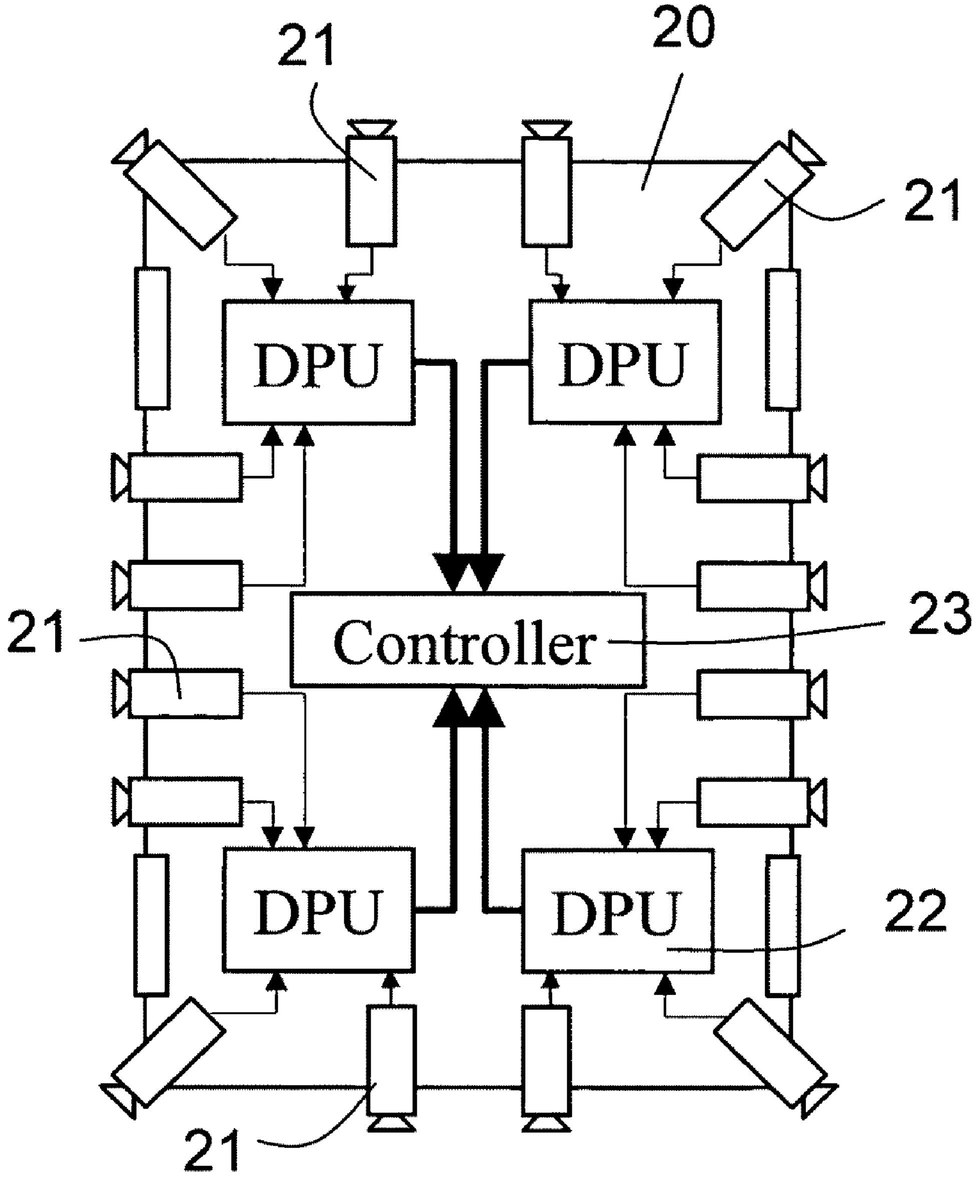
FIG. 2 illustrates a preferred embodiment of the driving support system of a vehicle according to the present invention.

Please refer to FIG. 2. It illustrates a preferred embodiment of the driving support system of a vehicle according to the present invention. As shown in FIG. 2, the driving support system includes plural image capturing devices 21 disposed around the vehicle 20; plural dimension processing units (DPUs) 22 connected with the plural image capturing devices 21 for receiving images from the plural image capturing devices and then producing plural related depth maps; and a controller 23 connected with the plural DPUs 22 for receiving the plural related depth maps and indicating a condition of a surrounding area of the vehicle.

In practice, the plural image capturing devices 21 are cameras for taking images. In this embodiment, there are 16 cameras disposed around the vehicle 20. Furthermore, there are 4 DPUs 22, wherein each DPU 22 connects with 4 image capturing devices 21. Certainly, the combination of image capturing devices 21 and DPU 22 is variable, wherein more than one of the plural image capturing devices 21 is connected to one of the plural DPUs 22.

Figure 3:
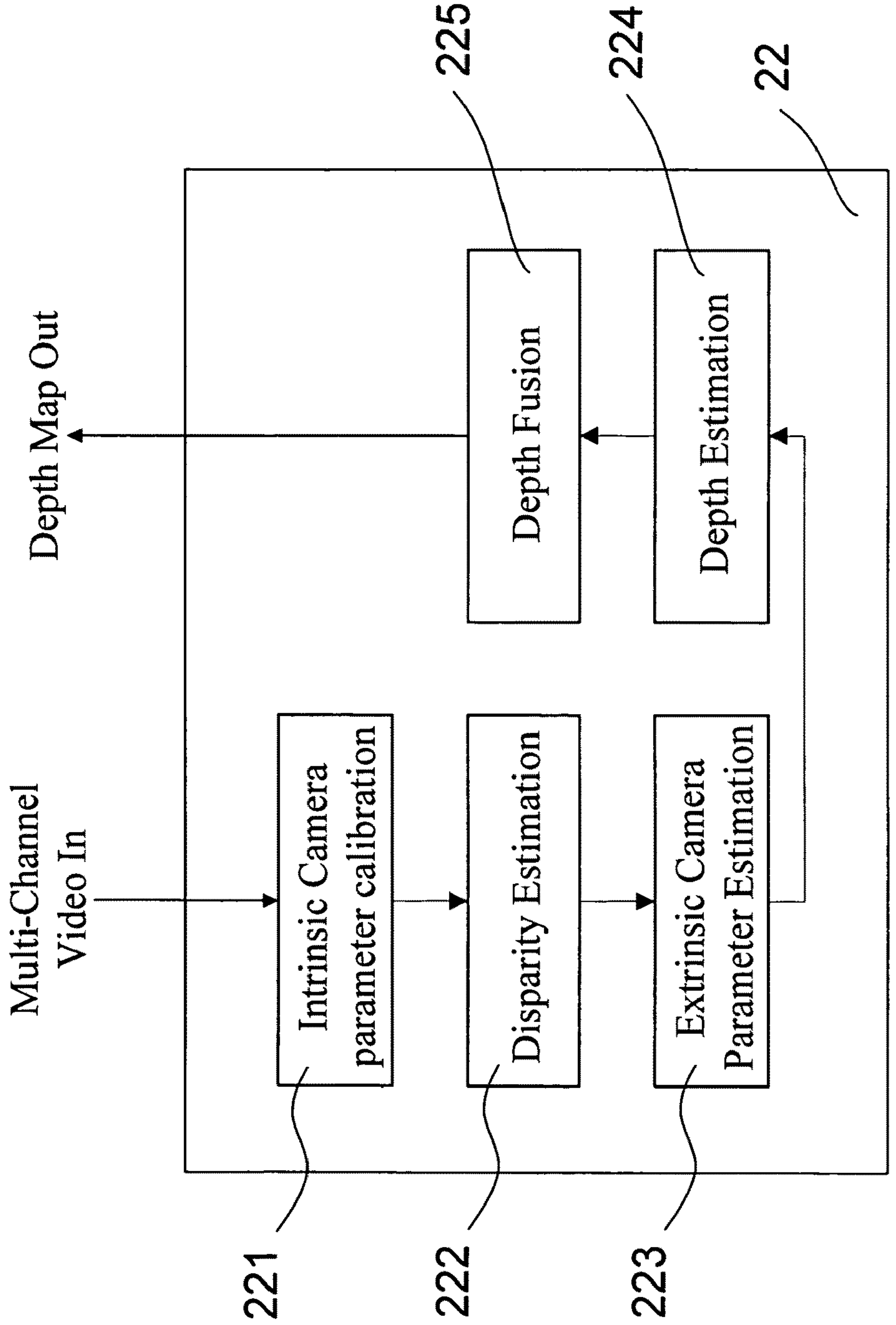
FIG. 3 illustrates the DPU structure of the present invention.

Please refer to FIG. 3. It illustrates the DPU structure of the present invention. As shown in FIG. 3, the DPU 22 of the present invention further includes an intrinsic camera parameter calibration module 221 for receiving images from the plural image capturing devices; a disparity estimation module 222 connected with the intrinsic camera parameter calibration module 221; an extrinsic camera parameter estimation module 223 connected with the disparity estimation module 222; a depth estimation module 224 connected with the extrinsic camera parameter estimation module 223; and a depth fusion module 225 connected with the depth estimation module 224 for outputting the plural related depth maps.

Figure 4:
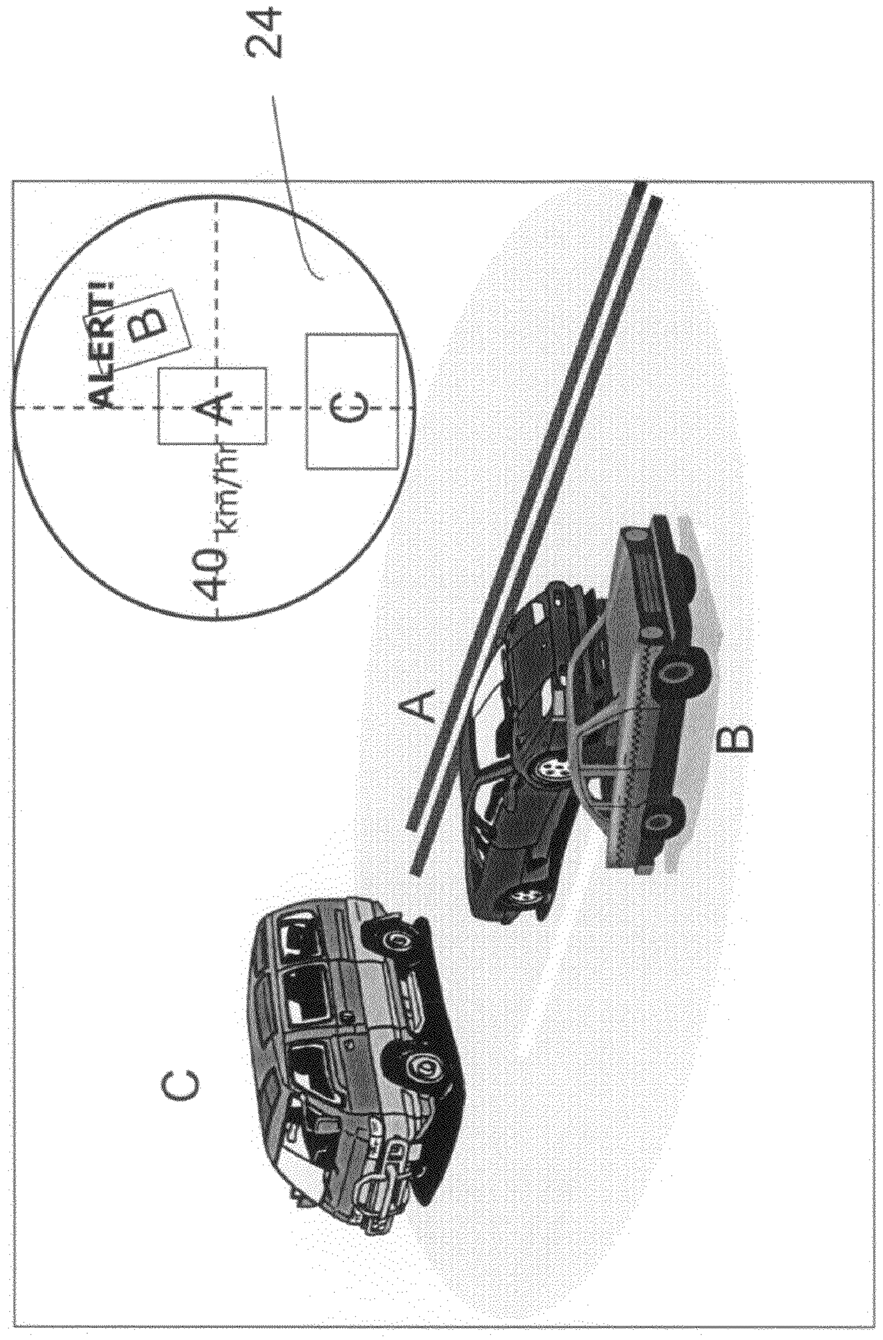
FIG. 4 illustrates a display device indicating the condition of the surrounding area of the vehicle in a vertical view according to the present invention.

In this embodiment, the driving support system further includes a display device connected with the controller for indicating the condition of the surrounding area of the vehicle in a vertical view. Please refer to FIG. 4. It illustrates a display device indicating the condition of the surrounding area of the vehicle in a vertical view according to the present invention. As shown in FIG. 4, Car A includes the driving support system, as shown in FIG. 2, of the present invention. Plural image capturing devices 21 disposed around the Car A could capture plural images and transmit to DPU 22, wherein the lens of the image capturing device 21 is calibrated by DPU 22, and the depth information is obtained via the DPU 22 from plural image capturing devices 21. In FIG. 4, the image capturing devices 21 disposed in front of the car A captures plural images of car B. After processing via DPU 22 and transmitting depth maps to the controller 23, the operator of car A could get wise to the relative position of car B in a vertical view, wherein the information is illustrated in the display device 24 of car A. Similarly, the image capturing devices 21 disposed in back of the car A captures plural images of car C, and the operator of car A could get wise to the relative position of car C form the display device 24 of car A. Certainly, the driving system could provide series alarms, such as flashing light or beeping sound, according to the information from the controller thereof for full protection.

Figure 5:
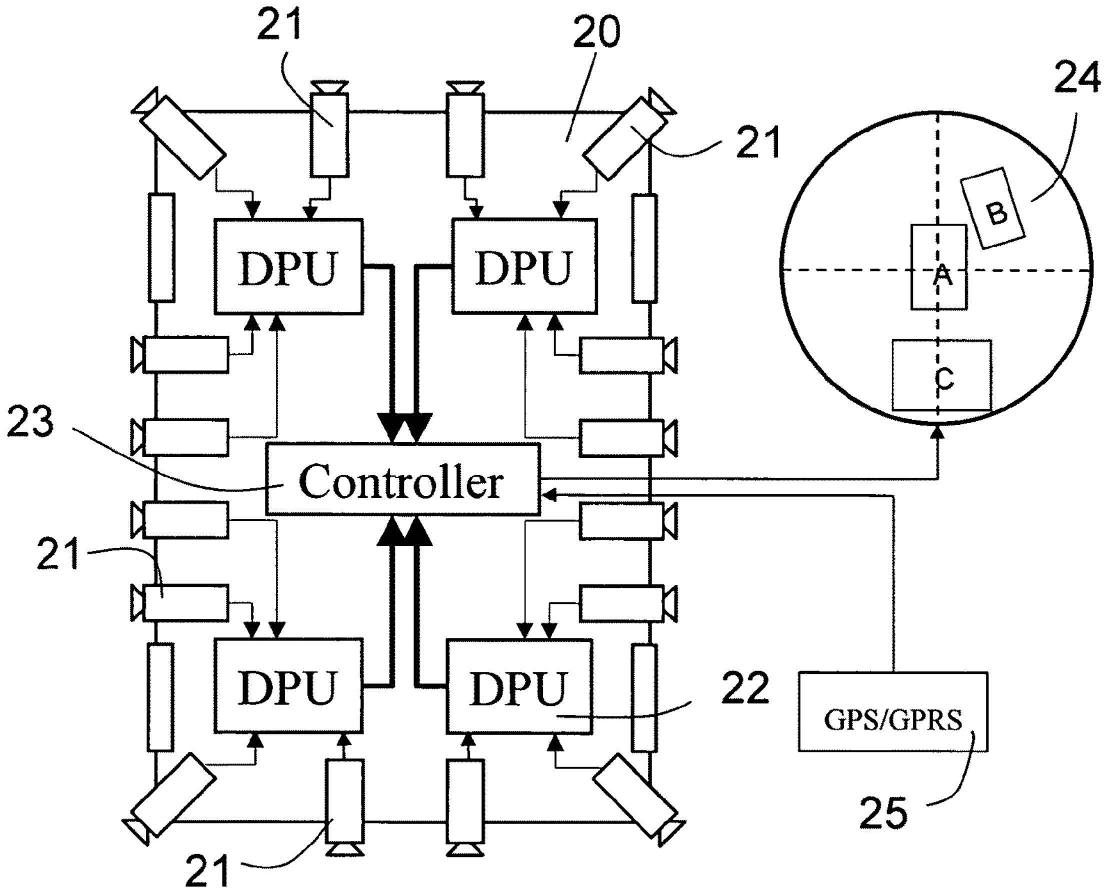
FIG. 5 illustrates another preferred embodiment of the driving support system of a vehicle according to the present invention.

Please refer to FIG. 5. It illustrates another preferred embodiment of the driving support system of a vehicle according to the present invention. As shown in FIG. 5, the driving support system of a vehicle 20 includes plural image capturing devices 21 disposed around the vehicle 20; at least a dimension processing unit (DPU) 22 connected with the plural image capturing devices 21 for receiving images from the plural image capturing devices and then producing plural related depth maps; a controller 23 connected with the DPU 22 for receiving the plural related depth maps and then producing an indicating data; and a display device 24 connected with the controller 23 for displaying the indicating data around the vehicle 20 in a vertical view. Furthermore, the driving support system further includes a GPS/GPRS module 25 communicating with the controller 23 for providing a display data, wherein the display data can be a unit's ID, a time, a GPS's latitude and longitude, a speed, a direction, a temperature, a device's status, an event number, a report configuration parameter, or a mixture thereof. Hence, the driving support system of the present invention introduces plural dimension processing units (DPUs) to process plural images for achieving the purpose of indicating a condition of a surrounding area of the vehicle in a vertical view, and further introduces GPS/GPRS module for integrating and providing a vehicle alarm information to a vehicle operator. Certainly, the DPU 22 of the present invention could further include an intrinsic camera parameter calibration module 221 for receiving images from the plural image capturing devices; a disparity estimation module 222 connected with the intrinsic camera parameter calibration module 221; an extrinsic camera parameter estimation module 223 connected with the disparity estimation module 222; a depth estimation module 224 connected with the extrinsic camera parameter estimation module 223; and a depth fusion module 225 connected with the depth estimation module 224 for outputting the plural related depth maps, as shown in FIG. 3.

In a word, the present invention provides a driving support system of a vehicle, including an image capturing module having plural image capturing devices disposed around the vehicle for taking plural images; an estimation module connected with the image capturing module via multiple channels for receiving the plural images and then producing plural related depth maps; a controller connected with the estimation module for receiving the plural related depth maps and then producing an indicating data; and a display device connected with the controller for displaying the indicating data around the vehicle in a vertical view.

Therefore, the present invention provides a driving support system to a vehicle operator, which introduces plural dimension processing units (DPUs) for processing plural images, simplifies the entire system and the control process thereof, is capable of achieving the purpose of indicating a condition of a surrounding area of the vehicle in a vertical view. Furthermore, the driving support system introduces a GPS/GPRS module communicating with the controller thereof for providing vehicle integrated and broad alarm information to a vehicle operator. Meanwhile the prior art fails to disclose that.

Accordingly, the present invention possesses many outstanding characteristics, effectively improves upon the drawbacks associated with the prior art in practice and application, produces practical and reliable products, bears novelty, and adds to economical utility value. Therefore, the present invention exhibits a great industrial value. While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A driving support system of a vehicle comprising:

plural image capturing devices disposed around said vehicle;

plural dimension processing units (DPUs) connected with said plural image capturing devices for receiving images from said plural image capturing devices and then producing plural related depth maps; and a controller connected with said plural DPUs for receiving said plural related depth maps and indicating a condition of a surrounding area of said vehicle;

wherein each of said plural DPUs further comprises:

an intrinsic camera parameter calibration module for receiving images from said plural image capturing devices;

a disparity estimation module connected with said intrinsic camera parameter calibration module;

an extrinsic camera parameter estimation module connected with said disparity estimation module;

a depth estimation module connected with said extrinsic camera parameter estimation module; and a depth fusion module connected with said depth estimation module for outputting said plural related depth maps.

2. The driving support system according to claim 1, wherein said plural image capturing devices are cameras.

3. The driving support system according to claim 1, wherein more than one of said plural image capturing devices is connected to one of said plural DPUs.

4. The driving support system according to claim 1, further comprising a display device connected with said controller for indicating said condition of said surrounding area of said vehicle in a vertical view.

5. The driving support system according to claim 1, further comprising a GPS/GPRS module communicating with said controller for providing a display data.

6. The driving support system according to claim 5, wherein said display data comprises a unit's ID, a time, a GPS's latitude and longitude, a speed, a direction, a temperature, a device's status, an event number, a report configuration parameter, and a mixture thereof.

7. A driving support system of a vehicle comprising:

plural image capturing devices disposed around said vehicle;

at least a dimension processing unit (DPU) connected with said plural image capturing devices for receiving images from said plural image capturing devices and then producing plural related depth maps;

a controller connected with said DPU for receiving said plural related depth maps and then producing an indicating data; and a display device connected with said controller for displaying said indicating data around said vehicle in a vertical view, wherein said DPU further comprises:

an intrinsic camera parameter calibration module for receiving images from said plural image capturing devices;

a disparity estimation module connected with said intrinsic camera parameter calibration module;

an extrinsic camera parameter estimation module connected with said disparity estimation module;

a depth estimation module connected with said extrinsic camera parameter estimation module; and a depth fusion module connected with said depth estimation module for outputting said plural related depth maps.

8. The driving support system according to claim 7, wherein said plural image capturing devices are cameras.

9. The driving support system according to claim 7, wherein more than one of said plural image capturing devices is connected to said DPU.

10. The driving support system according to claim 7, further comprising a GPS/GPRS module communicating with the controller for providing a display data.

11. The driving support system according to claim 10, wherein said display data comprises a unit's ID, a time, a GPS's latitude and longitude, a speed, a direction, a temperature, a device's status, an event number, a report configuration parameter, and a mixture thereof.

12. A driving support system of a vehicle comprising:

an image capturing module having plural image capturing devices disposed around said vehicle for taking plural images;

an estimation module connected with said image capturing module via multiple channels for receiving said plural images and then producing plural related depth maps;

a controller connected with said estimation module for receiving said plural related depth maps and then producing an indicating data; and a display device connected with said controller for displaying said indicating data around said vehicle in a vertical view;

wherein said estimation module further comprises plural dimension processing units (DPUs); and;

wherein each of said DPUs further comprises:

an intrinsic camera parameter calibration module for receiving images from said plural image capturing devices;

a disparity estimation module connected with said intrinsic camera parameter calibration module;

an extrinsic camera parameter estimation module connected with said disparity estimation module;

a depth estimation module connected with said extrinsic camera parameter estimation module; and a depth fusion module connected with said depth estimation module for outputting said plural related depth maps.

13. The driving support system according to claim 12, wherein said plural image capturing devices are cameras.

14. The driving support system according to claim 12, further comprising a GPS/GPRS module communicating with the controller for providing a display data.

15. The driving support system according to claim 14, wherein said display data comprises a unit's ID, a time, a GPS's latitude and longitude, a speed, a direction, a temperature, a device's status, an event number, a report configuration parameter, and a mixture thereof.

* * * * *